Patented Dec. 29, 1925.

1,567,506

UNITED STATES PATENT OFFICE.

ERNEST HOPKINSON, OF NEW YORK, N. Y.

METHOD OF UNIFORMLY AND INTIMATELY MIXING MATERIALS WITH RUBBER LATEX.

No Drawing.   Application filed October 16, 1922.  Serial No. 594,986.

*To all whom it may concern:*

Be it known that I, ERNEST HOPKINSON, a citizen of the United States, residing at New York city, county of New York, and State of New York, have invented a certain new and useful Method of Uniformly and Intimately Mixing Materials with Rubber Latex.

The present invention relates to a new method of intimately and uniformly associating rubber with other materials necessary or desirable in the finished article.

The usual method of accomplishing this now in commercial use is to mix the coagulated, washed and dried rubber with vulcanizing and compounding ingredients by subjecting it to a quite severe masticating operation between hot rolls.

By this invention the rubber is taken in the form of latex and associated with the other ingredients, whether liquid or solid, while it is in latex form. Many of the materials necessary or desirable to be added to the rubber, to produce the vulcanized product desired, have the effect of coagulating the latex before a uniform distribution of such materials is effected. Other materials do not mix with or are insoluble in the latex fluid.

The object of the invention is to effect a uniform distribution of such materials in the latex before or without bringing about coagulation, and thereafter to deprive such mixture of substantially all its water content while uniform distribution is maintained. Generally speaking, this desired result is obtained by causing the added materials to be brought into a colloidal form which is directly miscible with latex without coagulation. The character of the invention will be best explained by various illustrations of its embodiment, as follows:

First will be described a method whereby rubber may be derived from the latex of *Hevea brasiliensis* simulating in chemical characteristics and physical properties rubber obtained from other species of trees or shrubs. Rubber in its natural state is obtained from a great number of different trees and shrubs, the latices of which have varying characteristics. By far the greatest quantity of rubber, however, is obtained from the *Hevea brasiliensis*, which is the rubber tree cultivated in the Far East almost exclusively. However, many of the other rubbers, such as African rubbers, which, when dried, usually contain higher percentage of resin, oil and water-soluble material than *Hevea brasiliensis*, and are known as "soft" rubbers, are desirable for many purposes. One object of the invention is to obtain from the latex of *Hevea brasiliensis* a rubber which shall simulate such soft rubbers. It is found that this can be done by adding to the latex, oils or resins or both. If only an oil is to be added, a proper amount of the desired oil is taken and emulsified with water by passing the same through any good form of emulsifying or homogenizing machine. In this manner the oils may be broken up into particles or globules of about the same size as the rubber particles in the latex, or approaching the same state of division. Good stable emulsions of such oils have been made, such emulsions containing sixty per cent of oil and forty per cent of water. The proper amount of such emulsion is then stirred into the desired amount of latex, as a result of which the small globules of oil are uniformly distributed throughout the whole body of latex, the mixture then being deprived of its liquid contact in any desired way, but preferably by spraying the same into a heated atmosphere, as disclosed in my Patent No. 1,423,526, dated July 25, 1922, whereby there results a substantially dry, soft rubber which is easily milled and of quality and characteristics extremely desirable for some purposes.

If it is desired to add a gum or resin to the latex, the particular gum or resin desired is dissolved in one of its solvents, (such as carbon tetrachloride, naptha, benzol, turpentine, etc.), and such solution emulsified or homogenized with water, and then added to the latex, as before described, in the case of the oil, and the mixture deprived of its water content. The procedure just described with respect to resin is also followed with respect to other materials, for instance, phenol condensation products in their intermediate and soluble stages, stearic acid, paraffins and waxes. A particularly important application of the method is in the addition of vulcanizing ingredients, which cannot otherwise be added to latex without producing coagulation. For illustration, reference is made to oxybutylthiocarbonic acid disulphide $(C_4H_9OCS_2)_2$ and dibenzylamine $(C_6H_5CH_2)_2NH$, both of which are soluble in organic solvents, but insoluble in water, and when added to latex, promptly produce coagulation. If, however, either of these materials is dissolved in an organic solvent and then emulsified with water, such emulsion may be added to the latex and uniformly distributed therein by stirring, without producing coagulation, such emulsions remaining stable for a considerable length of time. An emulsion of oxybutylthiocarbonic acid disulphide may be added to latex so as to form a latex suspension of rubber in the proportion of one to two per cent of oxybutylthiocarbonic acid disulphide by weight of the dry rubber content of the latex. Similarly, an emulsion of dibenzylamine may be added to latex so as to give one to two per cent of dibenzylamine on the dry rubber content of the latex. With these two solutions, it is possible to obtain a rubber article, as for instance, a surgeon's glove, by alternately dipping an appropriate form in the two solutions, and partially or completely drying the material adhering to the form between each dip. Such a combination in admixture with the usual sulphur and zinc as described in British patent to Cadwell No. 177,493, issued November 8, 1923, will completely vulcanize at ordinary room temperatures after the liquid has evaporated, and will be considerably better than a rubber which has been vulcanized at the usual comparatively high temperature of about 270° F. Similarly, in other articles, the step of the process consisting of eliminating the water may take place in the substantially final form of the article.

In any or all of the foregoing illustrations there may be added an appropriate protective colloid, such as glue, saponin, etc., or some other protective agent, such as glycerine.

If it is desired to add solid materials, in finely divided form, such as carbon black, clays, wood flour, wood pulp, ground asbestos fibre, cotton linter, ground cork, etc., any or all of these are mixed with water and preferably in a colloidal mill, by which is meant a mixing device which effects the distribution of the finely divided material in such a thorough manner as to bring about what is substantially a colloidal suspension, which, with the different materials, varies as to the amount of water or other liquids necessary, it being understood that generally the object is to obtain perfect distribution and suspension with the minimum liquid content. When the mix is complete, an appropriate amount is added to the desired amount of latex, whether or not such latex contains other materials, such as those above referred to, namely, oil, vulcanizing ingredients, resins, etc., the latex, or latex and other materials being gently stirred as the suspension of solid materials is added. From this procedure there results a mass of solids and fluids containing all the materials necessary or desirable to be associated with the rubber to produce the desired vulcanized product. This mass, depending upon its physical characteristic as to whether it has a small water content and is plastic, or a large water content and substantially free flowing, is then deprived of its moisture by a drying process, in the latter case preferably by spraying in a heated atmosphere, and in the former, by being dried in the usual heat and humidity-controlled drying chambers now commonly used by rubber manufacturers. If the material is a mixture having a large proportion of solid materials and is sprayed, there results a powdered or granular product which may, in some cases, be placed in the vulcanizing molds without any other procedure, or may be given a slight warming and milling operation. If the wet mass has been dried in a kiln, a cake form results which requires a milling operation. If the mixture is one consisting only of rubber latex and oil, the results of the spraying operation is to obtain a substantially dry spongy product.

While specific embodiments of the invention have been described, it is obvious that numerous modifications may be made therein and it is not desired to limit the invention otherwise than as set forth in the appended claims.

Having thus described my invention, what I claim and desire to protect by Letters Patent is:

1. A method of mixing rubber with materials insoluble in water but soluble in organic solvents, comprising dissolving such materials in an organic solvent, forming a water emulsion of such solution, mixing the same with rubber latex, and then depriving such mixture of substantially all its liquid content.

2. A method of mixing rubber with other materials, which consists in forming a water emulsion of liquid materials and a suspension of finely divided solid particles, mixing both the emulsion and the suspension with rubber latex, and then depriving such mixture of substantially all its water content.

3. A method of mixing rubber with other materials which consists in forming a water emulsion of liquid material non-miscible with water, dissolving other materials in an organic solvent and forming an emulsion thereof, making a water suspension of finely divided solid particles, mixing said emulsions and suspension with rubber latex, and depriving such mixture of substantially all its water content.

Signed at New York city, county of New York, and State of New York, this 14th day of October, 1922.

ERNEST HOPKINSON.

materials which consists in forming a water emulsion of liquid material non-miscible with water, dissolving other materials in an organic solvent and forming an emulsion thereof, making a water suspension of finely divided solid particles, mixing said emulsions and suspension with rubber latex, and depriving such mixture of substantially all its water content.

Signed at New York city, county of New York, and State of New York, this 14th day of October, 1922.

ERNEST HOPKINSON.

Certificate of Correction.

It is hereby certified that in Letters Patent No. 1,567,506, granted December 29, 1925, upon the application of Ernest Hopkinson, of New York, N. Y., for an improvement in "Methods of Uniformly and Intimately Mixing Materials with Rubber Latex," errors appear in the printed specification requiring correction as follows: Page 1, line 58, for the word "percentage" read *percentages;* same page, line 83, for the word "contact" read *content;* page 2, line 104, for the word "results" read *result;* and that the said Letters Patent should be read with these corrections therein that the same may conform to the record of the case in the Patent Office.

Signed and sealed this 26th day of January, A. D. 1926.

[SEAL.]

WM. A. KINNAN,
*Acting Commissioner of Patents.*

Certificate of Correction.

It is hereby certified that in Letters Patent No. 1,567,506, granted December 29, 1925, upon the application of Ernest Hopkinson, of New York, N. Y., for an improvement in "Methods of Uniformly and Intimately Mixing Materials with Rubber Latex," errors appear in the printed specification requiring correction as follows: Page 1, line 58, for the word "percentage" read *percentages;* same page, line 83, for the word "contact" read *content;* page 2, line 104, for the word "results" read *result;* and that the said Letters Patent should be read with these corrections therein that the same may conform to the record of the case in the Patent Office.

Signed and sealed this 26th day of January, A. D. 1926.

[SEAL.]                           WM. A. KINNAN,
*Acting Commissioner of Patents.*